United States Patent [19]

LeBlanc

[11] 4,360,450

[45] Nov. 23, 1982

[54] COLLOIDAL AQUEOUS DISPERSION OF AN ALKALI METAL POLYANTIMONATE AND A PROCESS OF MAKING SAID

[75] Inventor: Destin A. LeBlanc, Manchester, Mo.

[73] Assignee: The Harshaw Chemical Company, Cleveland, Ohio

[21] Appl. No.: 325,079

[22] Filed: Nov. 25, 1981

Related U.S. Application Data

[63] Continuation of Ser. No. 68,260, Aug. 20, 1979, Pat. No. 4,307,148.

[51] Int. Cl.³ .......................... B01J 13/00; C09K 3/28
[52] U.S. Cl. .............................. 252/313 R; 106/18.28; 252/8.6; 252/607; 252/610; 423/87; 423/617
[58] Field of Search ............ 423/87, 617; 252/313 R, 252/610

[56] References Cited

U.S. PATENT DOCUMENTS

| 2,805,176 | 9/1957 | Sindl | 106/18.25 |
| 3,676,362 | 7/1972 | Yates | 423/87 |
| 3,860,523 | 1/1975 | Petrow | 252/313 R |
| 3,892,667 | 7/1975 | Touval . | |
| 4,028,266 | 6/1977 | Langere | 423/617 |
| 4,110,247 | 8/1978 | Gower et al. | 106/18.35 |
| 4,307,148 | 12/1981 | LeBlanc | 428/275 |

FOREIGN PATENT DOCUMENTS 579328 7/1946 United Kingdom .

*Primary Examiner*—James C. Cannon
*Attorney, Agent, or Firm*—Maky, Renner, Otto & Boisselle

[57] ABSTRACT

A process for improving the flame-retardant properties of cellulose containing fibrous materials in the absence of halogen compounds which comprises treating said fibrous materials with an effective amount of a colloidal aqueous dispersion of an alkali metal polyantimonate containing a mole ratio of alkali metal to antimony in the dispersion of at least about 0.3:1, and drying said materials is described.

6 Claims, No Drawings

COLLOIDAL AQUEOUS DISPERSION OF AN ALKALI METAL POLYANTIMONATE AND A PROCESS OF MAKING SAID

This application is a continuation of my pending application Ser. No. 68,260 filed Aug. 20, 1979, now U.S. Pat. No. 4,307,148.

BACKGROUND OF THE INVENTION

This invention relates to a method of treating fibrous materials to improve the flame retardant properties thereof, and to fibrous cellulosic materials which have been treated in accordance with the invention. More particularly, this invention relates to the use of particular antimony compounds for improving the flame-retardant properties of fibrous textile fabrics containing at least some cellulose.

Various fibrous textile materials such as cotton goods present an appreciable fire hazard due to the ease with which they can be ignited. The potential fire hazard has drawn considerable interest, and many suggestions have been made for improving the properties of textiles and reducing the fire hazard. This is particularly true in clothing and in carpeting.

Various compounds have been added to or incorporated into textile materials in an attempt to reduce the fire hazard when such materials are ignited. It is now well known that halogen-containing organic materials impart effective levels of flame retardancy to many textile materials particularly to synthetic organic polymers used in the formation of textile fabrics and carpeting. A number of metal compounds also have been reported in the literature as flame retardants for various substrates, and by far, the best known prior art compounds are compounds of antimony such as antimony oxides and antimony oxychloride. Other metal compounds which have been suggested as being useful fire retardants include the phosphates and borates of alkali and alkaline earth metals, titanium salts, tin salts, etc.

The most widely employed technique for improving the fire retardant properties of textile materials comprises impregnating and/or coating the textile with a combination of a halogenated resin or paraffin and an inorganic oxide material. Antimony compounds, such as antimony trioxide reportedly act as synergists with halogen-containing compounds at flame temperatures in that they significantly improve the flame retardancy imparted to the textile material at a given concentration of halogen compounds. This synergistic improvement is surprising since antimony oxides are ineffective when used alone. See, for example, U.S. Pat. No. 3,892,667 and *Flame Resistant Cotton*, W. A. Reeves and G. L. Drake, (1971, page 50). U.S. Pat. No. 3,860,523 describes colloidal antimony oxide sols which are suited for use with organic halogens such as polyvinyl chloride for improving the flame retardant properties of fabrics.

The use of the combination of a halogenated resin or paraffin with an inorganic oxide material may change the character of the textile because of the coating which may reduce the flexibility of the textile. Also, although such coatings are relatively water-resistant, they are generally not resistant to solvents such as used in dry-cleaning thereby limiting the usefulness of such treatments. Moreover, the requirement that the antimony oxides be used in combination with halogenated resins or paraffins adds to the cost of the fire-retardant treatment.

In U.S. Pat. No. 3,468,844, thermoplastic polyarylene polyethers are rendered flame retardant by incorporating effective amounts of antimony trioxide ($Sb_2O_3$). U.S. Pat. No. 3,892,667 describes the use of the combination of sodium antimonate and inorganic chlorine- or bromine-containing compounds as a flame retardant composition for synthetic organic polymer compositions. The patentees indicate that the sodium antimonate particles should contain at most, insignificant amounts of water-soluble alkaline materials. In U.S. Pat. No. 2,805,176, it is suggested that artificial materials or products of the viscose cellulose type such as viscose rayon can be flame-proofed by incorporating therein, a compound of a metal which can react with selected reactive groups within the viscose to produce an insoluble compound of the metal embodied within the cellulose fiber. Compounds of antimony, zirconium, tin, tungsten and titanium are described. For example, treating an unrelaxed viscose fiber containing a minor percentage of carboxy methyl cellulose with an appropriate antimonate results in the formation of an insoluble, hydrated antimony oxide or antimonic acid which is retained by the regenerated cellulose body.

British Pat. No. 579,328 describes a method of applying antimony compounds to fabrics and fibers to render them fire-resistant. The method described comprises impregnating the fibers or fabrics with a potassium antimonate and subsequently precipitating antimony oxide in the fiber by treatment with a salt of a strong acid and a weak base such as ferrous sulfate. The fireproofing obtained in this manner is reported to be substantially resistant to removal by washing with water.

SUMMARY OF THE DISCLOSURE

The flame retardant properties of cellulose-containing fibrous materials are improved in the absence of halogen compounds by treating said fibrous materials with an effective amount of a colloidal aqueous dispersion of an alkali metal polyantimonate containing alkali metal in an amount sufficient to provide a mole ratio of alkali metal to antimony in the dispersion of at least about 0.3:1, and drying said fibrous material.

DESCRIPTION OF THE PREFERRED EMBODIMENTS

The present invention relates to a process of improving the flame-retardant properties of cellulose-containing fibrous materials which comprises treating said fibrous materials with an effective amount of a colloidal aqueous dispersion of an alkali metal antimonate containing an alkali metal in an amount sufficient to provide a mole ratio of alkali metal to antimony of at least 0.3:1 and drying said textile. It has been discovered that when such dispersions containing the required alkali metal are utilized, the alkali metal polyantimonate provides improved flame retardant properties to cellulosic containing materials, and a halogen compound is not required.

The fibrous materials which are treated to improve the fire-retardant properties include paper, fabrics and carpeting, and, more particularly, are textile materials containing cellulose such as cotton, rayon and blends of cotton or rayon with synthetic fibers. Examples of suitable textile materials include cotton duck, cotton sheeting, and various types of cotton clothing fabric including drills, twills and poplins. Specific examples of blends of materials include 50% polyester and 50% cotton;

65% polyester and 35% cotton; 45% polyester and 55% cotton; 60% polyamide and 40% cotton. The type of synthetic fibers combined with the cotton is not critical to the invention, and any of the synthetic fibers normally used with cotton can be employed. One example of a suitable polyester is polyethylene terephthalate which is commercially available under a variety of trademarks such as Dacron from E. I. DuPont de Nemours and Co., Fortrel from Celanese Corp., Kodel from Eastman Kodak Co., and Trevira from Hystron Corp.

The alkali metal polyantimonate is applied to the textile material in the form of a colloidal aqueous dispersion. These dispersions generally are made by addition of an alkali metal salt, preferably the hydroxide, to either polyantimonic acid dispersions or antimonic acid solutions. In the latter case, the solutions must be allowed to polymerize after the alkali metal addition to form the desired alkali metal polyantimonate. Typical preparations involve ion-exchange of a metal antimonate slurry in water with a cation ion exchange resin, such as described in U.S. Pat. Nos. 3,860,523 and 4,110,247, to convert the metal antimonate to a clear aqueous solution of antimonic acid, which may contain some soluble oligomers of antimonic acid. Alkali metal salts may be added, typically as an aqueous solution of the hydroxide, to this antimonic acid solution, and the resultant product allowed to polymerize to form the desired alkali metal polyantimonate colloidal dispersion. This polymerization process may take place at room temperature, typically for eight to forty-eight hours, or may occur at elevated temperatures for shorter times.

Alternatively, the clear solution of aqueous antimonic acid may be allowed to fully polymerize at room or an elevated temperature, to form polyantimonic acid, and the alkali metal introduced to convert the polyantimonic acid to an alkali metal polyantimonate. Furthermore, the alkali metal may also be introduced at some intermediate stage of polymerization of the antimonic acid.

It now has been found in accordance with the present invention that if the colloidal aqueous dispersions of alkali metal polyantimonates containing alkali metal in an amount which is sufficient to provide a mole ratio of alkali metal to antimony of at least 0.3:1 and preferably at least about 0.45:1, treatment of cellulose materials with such dispersions improves the flame retardant properties of the cellulose material and halogen compounds as taught in the art are not required. Ratios of between about 0.45:1 to about 0.6:1 generally are utilized. Preferred examples of alkali metals include sodium and potassium.

It also has been observed that the durability of the sodium deposited and the flame-retardant properties imparted to textile materials in accordance with the method of the invention are improved further when the alkali metal is introduced into the dispersion prior to or during the polymerization of the antimonic acid to polyantimonic acid as described above. Examples of bases which can be utilized to introduce the alkali metal into the colloidal dispersions include sodium hydroxide and potassium hydroxide.

The concentration of alkali metal polyantimonate in the aqueous dispersions of the invention may be varied over a wide range, although it is preferred to use more concentrated dispersions in order to reduce the volume of dispersion which must be handled during the application procedure. In general, the colloidal aqueous dispersions used in the invention will comprise from about 20 to 50% of alkali metal polyantimonate although more concentrated or more dilute dispersions can be utilized in specific instances as desired. Suitable procedures for concentration of the dispersion are ultrafiltration and vacuum distillation.

The colloidal aqueous dispersions are applied to the fibrous material by any known techniques such as, for example, by immersion, spraying, padding, coating, or dipping, to deposit the desired amount of alkali metal polyantimonate in or upon the fibrous material. The required amount of alkali metal polyantimonate is that amount which is effective in improving the flame-retardant properties of the fibrous material. Generally, amounts of from about 4% to about 10%, and more preferably about 6-8% of antimony on a dry basis, based on the weight of the fibrous material are sufficient to provide the desired flame-retardant properties.

After application of the colloidal aqueous dispersions in accordance with the procedure described above, the fibrous material is dried to remove substantially all of the water. Drying can be effected at room temperature, but is preferably conducted at elevated temperatures such as temperatures up to about 100° to 150° C. The time required for drying will be dependent upon the nature of the textile material (type and thickness) and the temperature selected for drying. The conditions for drying any particular textile material can be readily determined by one skilled in the art.

Organic polymeric binders also may be applied to the textile materials to improve the durability of the alkali metal polyantimonate on or in the fibrous material. The binder may be applied to the textile separately or the colloidal aqueous dispersions which are applied to the textile materials can contain the binder materials. When the binder is not included in the dispersion but is applied to the textile in a separate step, the dispersion treated textile generally will be dried to remove some or most of the water prior to application of the binder.

The polymeric binder materials utilized in the invention include both monomers and polymers which when applied to the textile materials and reacted under the proper conditions, undergo polymerization and/or condensation whereby they are transformed to the thermoset state. Polymeric binder materials which can be employed in accordance with the present invention include acrylic polymers, ester polymers, olefin polymers, vinyl polymers, urethane polymers, epoxy resins, acetal resins, styrene-butadiene polymers and aminoplast resins. The amount of the polymeric binder material employed in the invention is determined primarily by the nature of the textile material being treated and the ultimate use of the material. Larger amounts of the polymeric binder generally will adversely affect the hand of the textile material. Generally, the amount of binder utilized can be up to about 20% by weight of the textile material although amounts between about 0.5 and 5% are preferred for textile fabrics.

Acrylic polymeric binders which can be utilized include those of acrylic acid, acrylic esters, acrylic amides and acrylonitrile and mixtures thereof. Examples of acrylamides include: N-methylol acrylamides; N-methylol methacrylamide; and N-methylol-N-methylol acrylamide. The presence of the methylol acrylamide in the acrylic polymer provides desirable self-cross-linking properties to the polymer thus enabling the application, deposition and curing of such polymeric binders on the textile material without the necessity of including cross-linking or curing agents which might deleteriously affect the desirable properties of the binder and/or the alkali metal polyantimonate. Examples of acrylic polymeric binders which are useful in this invention include polymers obtained from mixtures of alkyl acrylates such as ethyl acrylate, acrylonitrile and an N-methylol acrylamide. Emulsions of these types are commercially available from, for example, Rohm and Haas Company under the general trade designation "Rhoplex". Specific examples of such a commercially available acrylic latex binder include "Rhoplex TR 520" and "Rhoplex HA-8".

Examples of aminoplast resin compositions which are useful as binders in the invention include urea-formaldehyde adducts such as propyleneurea-formaldehyde and dimethylolurea; melamine-formaldehyde resins such as trimethylol melamine; alkylol amides such as methylol formamide, etc. Mixtures of such resins also are useful as binders of the invention. Examples of other binders include polyethylenes, polypropylenes, polyvinyl chlorides, polyvinyl acetates and various polyurethane latexes.

In addition to the alkali metal polyantimonate and polymeric binder, the dispersions utilized in the invention may contain other compositions useful in improving the general properties of textile materials. Thus, the dispersions may contain lubricants, softeners, plasticizers, dyestuffs, etc. Especially for flame-resistance treatments where afterglow protection is required, a conventional afterglow suppressant material, such as borates (zinc borate or barium metaborate), phosphates such as diammonium phosphate and ammonium polyphosphates available from Monsanto under the trade designation "Phos-chek", alumina trihydrate, and silicas such as colloidal silicas available from Nalco under the general trade designation "Nalcoag", must be included in the formulation. Amounts of from 1 to 6% and preferably 3 to 4% are utilized.

When a polymeric binder is applied to the textile materials in accordance with the above-described embodiments, the polymeric binder is cured by subjecting the treated textile material to elevated temperatures for a sufficient period of time. The time and temperature relationship for any particular polymeric binder and textile material can be determined readily by one skilled in the art. For example, acrylic polymeric binders can be cured by heating at temperatures of up to about 150° to 200° C. for a period from about 2 to 5 minutes.

The following examples will illustrate the procedure of the invention for improving the flame retardant properties of cellulose containing materials. Unless otherwise indicated, all parts and percentages are by weight.

PREPARATION OF DISPERSIONS

Example 1

A slurry of 47.5 parts of sodium antimonate in 800 parts deionized water is prepared. The slurry is pumped through an ion exchange column containing 700 parts deionized water and 247 parts of Amberlite IR-120 Plus (H) resin (a hydrogen form cation exchange resin available from Rohm & Haas Co.) at a rate of 8.4 gpm/ft$^2$ and which is sufficient to fluidize the resin bed. The sodium antimonate slurry is recirculated through the column, and the pH monitored. After about fifteen minutes (three cycles), the pH of the slurry drops from eight to two. Recirculation of the mixture for an additional forty-five minutes reduces the pH to 1.76. At this time the solution is recovered and the column rinsed with additional water to remove all antimony present. The resultant solution is filtered to remove unreacted sodium antimonate and any resin carryover. The filtrate is a clear solution of antimonic acid or antimonic acid oligomers containing 1.0% antimony.

Example 2

The clear antimonic acid solution of Example 1 is allowed to polymerize at room temperature for two days to produce a milky-white colloidal dispersion of polyantimonic acid. The polyantimonic acid is concentrated by means of ultrafiltration to produce a concentrated polyantimonic acid colloidal dispersion containing 22.5% antimony.

Example 3

To 25 parts of the concentrated polyantimonic acid product of Example 2 there are added 11 parts of 10% aqueous sodium hydroxide with vigorous stirring for about one hour. The pH of the colloidal dispersion increases from about 2 to about 8, and the desired sodium polyantimonate colloidal dispersion has an antimony content of 15.6% and a sodium to antimony molar ratio of 0.6:1.

Example 4

To 25 parts of the concentrated polyantimonic acid product of Example 2 there are added 15.1 parts of 8.6% aqueous potassium hydroxide with vigorous stirring for one hour. The pH of the colloidal dispersion increases from about 2 to about 8, and the desired potassium polyantimonate colloidal dispersion has an antimony content of 14.0% and a potassium to antimony molar ratio of 0.5:1.

Example 5

The procedure of Example 4 is repeated except that only 9.1 parts of 8.6% potassium hydroxide are added. The pH increases to about 5. The antimony content of the resultant potassium polyantimonate dispersion is 16.4%, and the potassium to antimony molar ratio is 0.3:1.

Example 6

To 100 parts of the clear antimonic acid solution of Example 1 there are added 3 parts of 1N sodium hydroxide. This mixture is then heated for eight hours at 65° C. A colloidal dispersion of sodium polyantimonate containing 0.97% antimony and having a sodium of antimony molar ratio of 0.35:1 is obtained.

Example 7

The procedure of Example 6 is followed except that 5 parts of 1N sodium hydroxide are added. A colloidal dispersion of sodium polyantimonate containing 0.95% antimony and having a sodium to antimony molar ratio of 0.6:1 is obtained.

Example 8

To 100 parts of the clear antimonic acid solution of Example 1 are added 9.8 parts of aqueous 2% sodium hydroxide over a period of eight hours using vigorous stirring. This material is allowed to polymerize for two days at room temperature to produce a dilute colloidal dispersion of sodium polyantimonate. This dilute dispersion is then ultrafiltered to produce a concentrated dispersion containing 30% antimony and a sodium to antimony molar ratio of 0.6:1.

TEXTILE TREATMENTS

The following examples illustrate the methods of treating fibrous materials using alkali metal polyantimonate dispersions of the type represented by the above examples. When a binder is utilized, it can be included in the dispersions, or the binder can be added to the fibrous material after the dispersion has been applied to the material.

Example A

An aqueous pad bath is prepared containing 45% of the sodium polyantimonate of Example 3. A 5.5-ounce cotton fabric is padded with this bath to a 95% wet pick-up and dried for five minutes at 110° C. The fabric has an antimony add-on of 6.3%. When tested by the flame test procedure of FF5-74 (the size 7-14 Children's Sleepwear Standard of the U.S. Consumer Product Safety Commission), the fabric had a char length of 3.6 inches and no afterflame.

Example A-1

(Control—no alkali metal)

An aqueous pad bath is prepared containing 54% of the polyantimonic acid colloidal dispersion prepared in Example 2. A 5.5-ounce cotton fabric is padded with the bath to a 95% wet pick-up and dried for five minutes at 110° C. The fabric has an antimony add-on of 15.4%. When tested by the flame-test procedure of FF5-74, the fabric burns the entire specimen length, thus failing the test.

Example B

An aqueous pad bath is prepared containing 35% of the product from Example 4, 5% of zinc borate and 2% of Rhoplex K-3 (a 45% solids acrylic latex emulsion from Rohm & Haas Co.). A 5.5-ounce cotton fabric is padded with this bath to a wet pick-up of 90%, dried for five minutes at 110° C. and then cured for three minutes at 160° C. The fabric has an antimony add-on of 4.4%. When tested by the flame test procedure of Method 5903 of Federal Test Method Standard 191, the fabric has a char length of 5.75 inches, no afterflame, and 159 seconds afterglow.

Example C

An aqueous pad bath is prepared containing 70% of the potassium polyantimonate dispersion from Example 5, 5% of zinc borate and 2% Rhoplex K-3. A 5.5-ounce cotton fabric is padded with this bath to a 95% wet pick-up, dried for five minutes at 110° C. and cured for three minutes at 160° C. The fabric has an antimony add-on of 10.3%. When tested by the flame test procedure of Method 5903, the fabric has a char length of 6.0 inches, no afterflame and 207 seconds afterglow.

Example D

A 5.5-ounce cotton fabric is padded with the colloidal dispersion of Example 7 five times and dried at 110° C. after each pass through the padder. The fabric is then padded through 5% Rhoplex K-3, dried at 110° C. and cured at 160° C. for three minutes. The fabric contains 0.33% Na by analysis. A portion of the treated fabric is leached according to the specifications of CPAI-84 (a specification for tents of the Canvas Products Association International) involving a 72-hour leach in water at 15.5-21.1° C. with six changes of water by emptying and refilling. After air drying, the leached fabric is reanalyzed and contains 0.33% Na, showing no loss of sodium upon leaching.

Example E

An aqueous pad bath is prepared containing 60% of the sodium polyantimonate dispersion from Example 8, 6% of zinc borate and 6% of Rhoplex K-3. A 6.2-ounce 50/50 polyester/cotton blended fabric is padded with the bath to an 80% wet pick-up, dried at 110° C. and then cured for three minutes at 160° C. The fabric has an antimony add-on of 14.4%. In the Method 5903 flame test procedure, the fabric has a char length of 6.50 inches, no afterflame and 124 seconds afterglow.

Example F

An aqueous pad bath is prepared containing 0.7% of sodium hydroxide and 31% of Nyacol A1530, a commercial 30% sol of "antimony pentoxide" available from Nyacol, Inc. The commercial sol contains 22.5% antimony and sodium such that the mole ratio of sodium to antimony is about 0.25:1. The mole ratio of sodium to antimony in the pad bath is 0.55:1.

A 5.5-ounce cotton fabric is padded with this bath to an 85% wet pick-up, dried for five minutes at 110° C. and cured for three minutes at 160° C. The fabric has an antimony add-on of 6.1%. When tested by the flame test procedure of FF5-74, the specimens of treated fabric have an average char length of 3.4 inches.

I claim:

1. A colloidal aqueous dispersion of an alkali metal polyantimonate containing a mole ratio of alkali metal to antimony in the dispersion of at least about 0.3:1.

2. The aqueous dispersion of claim 1 wherein the mole ratio of alkali metal to antimony is at least about 0.45:1.

3. The aqueous dispersion of claim 1 wherein the alkali metal is sodium or potassium.

4. The aqueous dispersion of claim 3 wherein the mole ratio of sodium or potassium to antimony is from about 0.45:1 to about 0.6:1.

5. A method of preparing the colloidal aqueous dispersion of claim 1 comprising adding an alkali metal base to an aqueous solution of antimonic acid prior to or during polymerization to polyantimonic acid.

6. The method of claim 5 wherein the aqueous solution of antimonic acid is prepared by passing an aqueous slurry of a water-insoluble metal antimonate through a cation exchange resin.

* * * * *